United States Patent Office 3,395,745
Patented Aug. 6, 1968

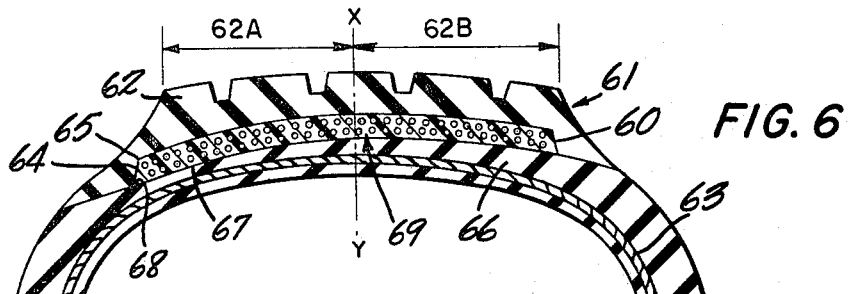
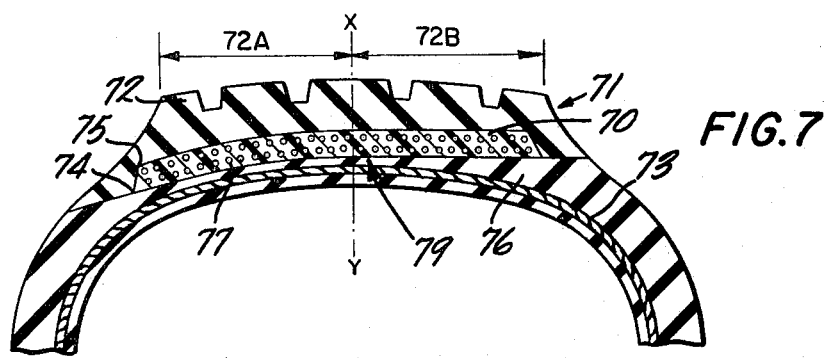
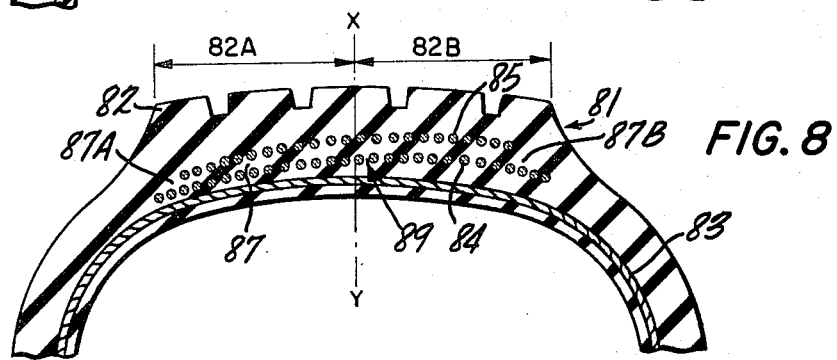
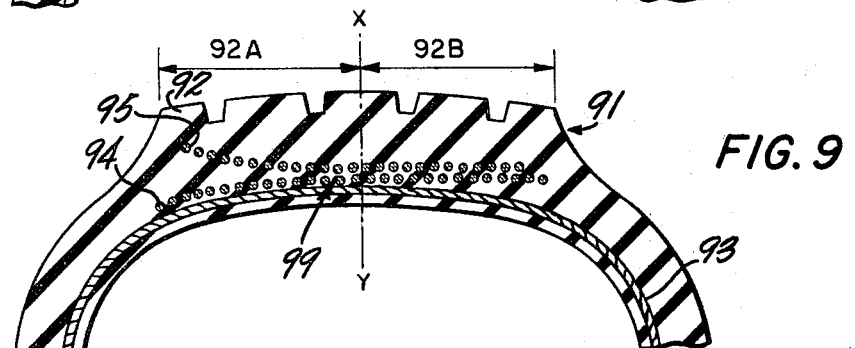

3,395,745
VEHICLE TIRE
Jean-Marie Massoubre, Clermont-Ferrand, France, assignor to Compagnie Generale des Etablissements Michelin, raison sociale Michelin & Cie, Clermont-Ferrand, Puy-de-Dome, France
Filed Nov. 30, 1965, Ser. No. 510,555
Claims priority, application France, Dec. 2, 1964, 997,174
7 Claims. (Cl. 152—361)

ABSTRACT OF THE DISCLOSURE

A pneumatic tire for vehicles having plies of cords of substantially uniform structure and dimensions between the carcass of the tire and the tread, the plies being substantially coextensive with the tread and one of said plies being positioned so that a portion of the ply on one side of the median plane of the tire is radially unsymmetrical with respect to the portion of the ply on the other side of the median plane to render the characteristics of the tire unsymmetrical and thereby improve its wear resistance and its roadability in sharp curves taken at high speed.

---

This invention relates to improvements in the wear-resistance of tire casings and more particularly to tire casings which are strengthened by a nonsymmetrical reinforcement placed between the carcass and the tread of the tire.

Heretofore, tires with reinforcements within the tread have been known and, in fact, tires which are nonsymmetrical with respect to the median longitudinal plane of the tire have been developed in order to impart to the tread a better resistance to wear especially in small radius turns. In these prior art tires the nonsymmetry has been obtained by arranging the cords of the plies forming the reinforcement of the treads at different angles or by varying the nature of the cords or the width or the number of plies on each side of the median plane.

Although some of these prior art tires with nonsymmetric crown reinforcements on one side of the longitudinal median of the plane improved the resistance to wear over that of the previously known tires, it has been found that tires having plies of the cords forming crown reinforcements which end abruptly at a point beneath the tread do not achieve the even greater resistance to wear now possible when using the invention described herein. One means for further improving the tires with nonsymmetric crown reinforcements has been proposed, namely to reinforce the discontinuous zone of the reinforcing ply by means of a narrow ply of cords arranged in the area of this zone. This method, however, has not sufficiently improved the prior art tire and has, in addition, complicated its manufacture and added to its expense.

Furthermore, when using the prior art means for obtaining nonsymmetry in the crown reinforcement, it has been necessary to manufacture several kinds of plies as is the case where such nonsymmetry is obtained by differing the angles or structural characteristics of the cords. The invention disclosed herein, however, eliminates this manufacturing requirement in addition to improving the quality of the tire.

Specifically this invention discloses a method for obtaining a nonsymmetrical reinforcement containing plies which are not interrupted longitudinally and each of which consists of cords which are of the same kind and which are inclined at an angle which is approximately constant at both edges of the plies.

In accordance with the invention, the nonsymmetry of the reinforcement in this invention is obtained by arranging one side of at least one of the plies forming the crown reinforcement at a mean distance from the carcass which is different from the mean distance separating the other half of the ply from the carcass on the other side of the longitudinal median plane of the tire. By arranging the tire in this manner it has been found that the resistance of the tire to wear has substantially improved.

A fuller understanding of the invention may be had by referring to the following description and claims, taken in conjunction with the accompanying drawing in which:

FIGURE 6 is a partial cross-sectional view of another form of tire casing embodying the present invention;

FIGURE 7 is a partial cross-sectional view of still another form of tire casing embodying the present invention;

FIGURE 8 is a partial cross-sectional view of another form of tire casing embodying the present invention; and FIGURE 9 is a partial cross-sectional view of still another form of tire casing embodying the present invention.

Figure 1:
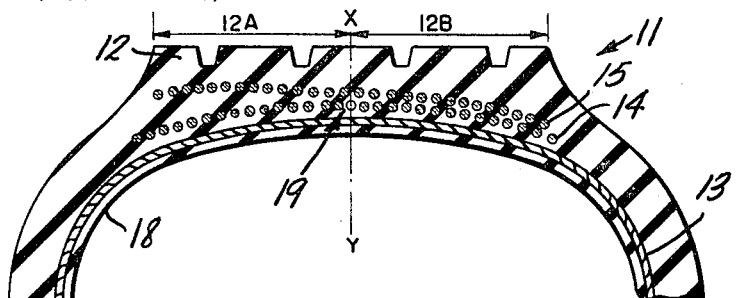
FIGURE 1 shows a partial cross-sectional view of a tire casing embodying the present invention.

With reference to the drawings, the invention is illustrated as being incorporated in FIG. 1 in the tire casing indicated by the reference character 11. The tire casing 11 has a tread portion 12 which extends across its upper surface and which is divided, in the preferred embodiment, by the longitudinal median plane X–Y into two portions 12A and 12B.

Within the casing 11 and in an area substantially adjacent to its inner surface 18 is a carcass 13 which is composed, in the preferred embodiment, of a plurality of radial cords. Between the tread 12 and the carcass 13 is a reinforcement 19 composed of two plies 14 and 15, each of which is formed from a plurality of cords running parallel in each ply and crossing the cords of the other ply.

In the embodiment shown in FIG. 1, the ply 14 has a degree of curvature which is substantially parallel to the degree of curvature of the carcass 13 over the entire width of ply 14. In contrast thereto, the ply 15 which is located between the ply 14 and the tread 12, is separated from the carcass 13 by a greater distance in the area below the tread portion 12A than the portion of ply 15 which extends into the area below the tread portion 12B. In this embodiment the portion of ply 15 which extends below the portion of tread portion 12B has a degree of curvature which is substantially the same as the degree of curvature of the carcass 13. The portion of ply 15 below the half tread portion 12A, on the other hand, progressively increases in distance from the carcass 13 as the ply extends away from the longitudinal median plane X–Y.

Figure 2:
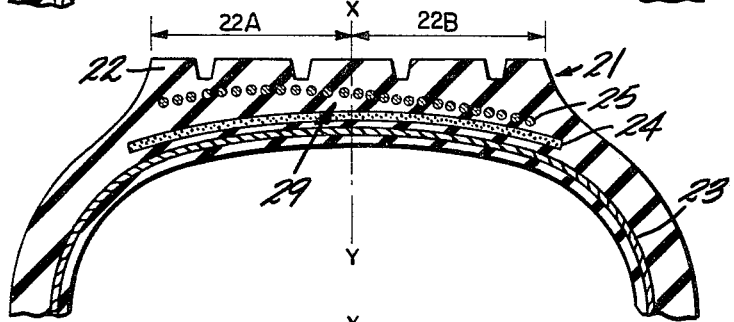
FIGURE 2 is a partial cross-sectional view of a modified form of a tire casing embodying the present invention.

In FIG. 2 the crown reinforcement 29 lies between the tread 22 and the carcass 23 within the tire casing 21. The reinforcement 29 differs from the reinforcement 19 in FIG. 1, only in that inner ply 24 consists of an elastomer which is reinforced by short pieces of metal wire arranged in any given direction. The ply 24, as does the ply 14, has a degree of curvature which is substantially parallel to the degree of curvature of the carcass 23.

The ply 25, on the other hand, is nonsymmetric with respect to the longitudinal median plane X–Y and, although it has a degree of curvature which is substantially the same as that of the carcass 23 in the portion of the tire below tread 22B, the portion of ply 25 below tread portion 22A does not have a degree of curvature parallel or similar to that of the carcass 23, but rather progressively increases its distance from carcass 23.

Figure 3:
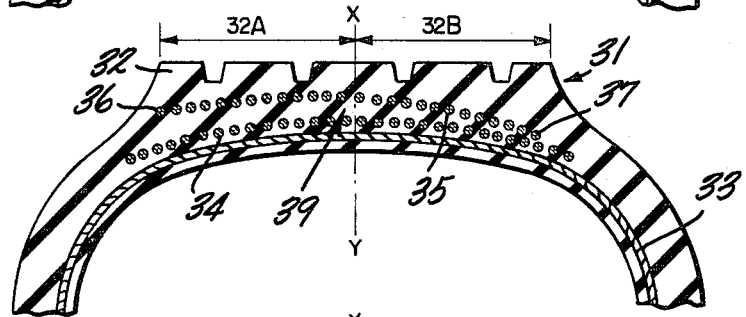
FIGURE 3 is a partial cross-sectional view of a third form of a tire casing embodying the present invention.

In FIG. 3 the embodiment shown in the reinforcement 39 is composed of two plies 34 and 35 positioned between the tread 32 and the carcass 33. Inner ply 34, as does ply 14 in FIG. 1, has a degree of curvature which is substantially parallel to the degree of curvature of the carcass 33. Ply 35, on the other hand, in contrast to ply 15 in FIG. 1, also has a degree of curvature which is substantially the same as that of carcass 33. Ply 35 is, of course, non-symmetrical with respect to the longitudinal median plane X–Y because the portion 37 of ply 35, which is below tread portion 32B, is substantially closer to ply 34 than the portion 36 of ply 35 which is below the tread portion 32A.

Figure 4:
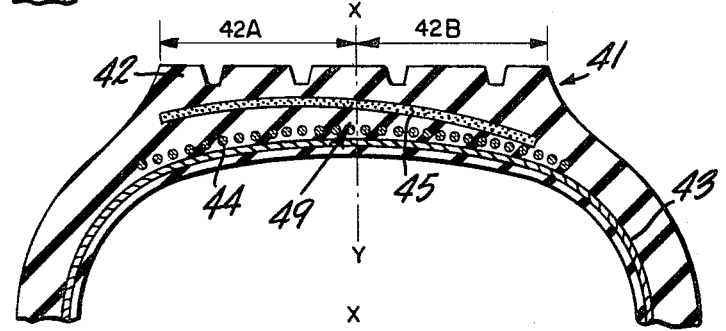
FIGURE 4 is a partial cross-sectional view of a fourth embodiment incorporating the present invention.

The embodiment shown in FIG. 4 discloses a crown reinforcement 49 composed of an inner ply 44 made from a plurality of parallel cords, which ply 44 has a degree of curvature substantially parallel to the degree of curvature of the carcass 43. Reinforcement 49 has a second ply 45 which is positioned between ply 44 and tread 42 and is composed of an elastomer which is reinforced by short pieces of textile fiber. As in the embodiment shown in FIG. 3, the outer ply 45 has a degree of curvature substantially the same as the degree of curvature of the carcass 43, but is nonsymmetrical with respect to the longitudinal median plane X–Y because the portion of ply 45 located below tread portion 42B is substantially closer to ply 44 than the portion of ply 45 below tread portion 42A. In this manner the reinforcement 49 is nonsymmetrical with respect to the longitudinal median plane X–Y of the tire casing 41.

Figure 5:
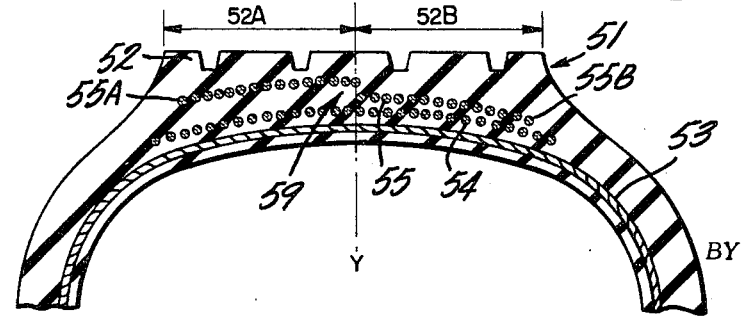
FIGURE 5 is a partial cross-sectional view of a fifth embodiment incorporating the present invention.

The embodiment shown in FIG. 5 discloses a reinforcement 59 which is composed of two plies of cords, an inner ply 54 and an outer ply 55. The inner ply 54 has a degree of curvature substantially parallel to the degree of curvature of the carcass 53 whereas the outer ply 55 is divided into two half ply portions 55A and 55B. The half ply portion 55B has a degree of curvature substantially parallel to the carcass 43 and is located closer to the inner ply 54 than the second half ply portion 55A. The half ply portion 55A also has a degree of curvature which is substantially parallel to the degree of curvature of the carcass 53 but it is more distant from the carcass 53 than the ply portion 55B. Again the longitudinal median plane X–Y serves as the dividing line between the ply portions 55A and 55B. It should be noted that the area of discontinuity in this embodiment is minimal and that the type and quantity of the plies on each side of the longitudinal median plane is substantially the same.

In the embodiment shown in FIG. 6 the ply reinforcement 69 is placed between the carcass 63 and the tread 62 and consists of two plies of cables 64 and 65 arranged in a position parallel to each other in an elastomer 67. The degree of curvature of the elastomer 67 is substantially the same as the degree of curvature of the carcass 63, although the elastomer 67 is nonsymmetrical with respect to the longitudinal median plane X–Y because the portion 68 of reinforcement 69 below tread portion 62A, is closer to the carcass 63 than the portion 60 of reinforcement 69 below tread portion 62B.

The embodiment shown in FIG. 7 is similar to that shown in FIG. 6 in that the reinforcement 77 is composed of an elastomer substance surrounding two parallel plies of cables 74 and 75. The embodiment of FIG. 7, however, is distinct from that shown in FIG. 6 in that the degree of curvature of the portion of reinforcement 77 below tread portion 72B is substantially distinct from the degree of curvature of carcass 73. The portion of reinforcement 77 below tread portion 72A in FIG. 7, however, has a degree of curvature substantially the same as the degree of curvature of carcass 73.

The embodiment shown in FIG. 8 discloses a reinforcement 89 which is composed of two plies of cords 84 and 85, disposed between a carcass 83 and the tread 82 in a tire casing 81. In this embodiment both the ply 84 and the ply 85, from edge 87A to edge 87B, increase their distance from carcass 83. At the same time ply 85 also becomes progressively spaced apart from ply 84 as it approaches edge 87B. This results in both plies 84 and 85 being nonsymmetrical with respect to the longitudinal median plane X–Y, thus increasing the resistance of tire casing 81 to wear.

In the embodiment shown in FIG. 9 the reinforcement 99 is composed of two plies of cords 94 and 95. Ply 94 is substantially parallel to the carcass 93 in the portion of the tire casing 91 which is below tread portion 92A. Ply 94, however, becomes progressively distant from the carcass 93 in the area of the tire casing below tread portion 92B. On the other hand, ply 95 is substantially parallel to ply 94 in the area of the tire casing 91 which is below tread 92B and becomes progressively distant from ply 94 in the portion of the tire casing 91 below tread portion 92A.

In all of the embodiments shown in FIGS. 1–9, the tread has a thickness which is less on one side of the longitudinal median plane than the thickness of the tread on the other side. For example, the thickness of the tread is less in the half of the tread where at least one of the plies or half ply of the crown reinforcement is arranged at a greater distance from the carcass than in the portion of the same reinforcement which is closer to the carcass.

This is clearly shown in FIGS. 6 and 7. In addition, these same figures show that the thickness of the elastomer layers 66 and 76, between the carcass 63 and the ply 64 and the carcass 73 and the ply 74, vary progressively in order to achieve the difference in spacing which forms the subject of this invention. It is clear in both FIGS. 6 and 7 that the elastomer layers 66 and 76 increase in thickness as they progress from the portion of the tire beneath tread portions 62A and 72A to the portion of the tire beneath tread portions 62B and 72B.

In all of the other embodiments shown in FIGS. 1–5 and 8–9, it is the elastomer layer placed between the two plies forming the reinforcement which varies in thickness thereby causing this varied spacing from the carcass.

In addition to the embodiments described above, further modifications are envisioned which are within the scope of the invention. Thus, for example, it is not absolutely necessary that the distance between the carcass and at least one of the reinforcing plies of the crown vary over at least half of the width of the tread since good results have been obtained even if this variation extends over approximately one-fourth of the tread width. Similarly, it is not necessary that the width of the crown reinforcement be limited to the width of the tread and at least one of the plies forming the reinforcement may extend to the sidewalls of the tire. Also embodiments are envisioned where the one ply of the crown reinforcement which is arranged at a distance which is substantially constant from the carcass over the entire width of the tire may be radially placed on the outside of the ply or plies which are not uniformly spaced from the carcass. In these embodiments where the outer ply is parallel to the carcass and symmetrical about the longitudinal median plane and the inner ply is not, the thickness of the tread may be the same on both sides of the median plane X–Y. Thus, the invention is not to be limited by the preferred embodiments shown in FIGS. 1–5 where only the inner ply is parallel to the degree of curvature of the carcass and is symmetrical about the longitudinal median plane. Nor is it to be limited to the preferred embodiments shown in FIGS. 6–9 where both the inner and outer plies are nonsymmetrical about the longitudinal median plane.

Similarly, the carcass may consist of natural, artificial or synthetic textile cords, glass or metal cords, arranged radially, that is in planes passing through the axis of rotation of the tire.

Still further, it is obvious that the arrangement in accordance with this invention is also applicable to crown reinforcements which consists of more than two plies of cords or fibers as shown here in the preferred embodiments.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereafter claimed.

I claim:

1. A tire casing having a tread and a carcass spaced from said tread comprising a reinforcement positioned between the tread and the carcass and substantially coextensive with said tread, said reinforcement having a plurality of plies, each ply being of substantially uniform structure and dimensions, at least one of said plies having a portion on one side of the longitudinal median plane of the tire positioned radially non-symmetric with respect to the portion of said one ply on the other side of said median plane.

2. A tire casing as defined in claim 1 wherein said reinforcement comprises two plies, the ply nearer said tread being radially nonsymmetric with respect to the longitudinal median plane of the tire and the ply nearer to the carcass of said tire being radially symmetric about said longitudinal median plane of the tire.

3. A tire casing as defined in claim 1 wherein said reinforcement comprises a first ply which is symmetric about the longitudinal median plane of the tire and a split second ply, half of which lies on one side of said longitudinal median plane and is closer to the carcass of said tire than the other half of said second ply on the other side of said longitudinal median plane.

4. A tire casing as defined in claim 1 wherein said reinforcement comprises an inner ply which is symmetric about the longitudinal median plane of the tire, and a split outer ply, half of which lies on one side of said longitudinal median plane and is closer to the carcass of said tire than the other half of said outer ply on the other side of said longitudinal median plane.

5. A tire casing as defined in claim 1 wherein said reinforcement is composed of a plurality of plies all of which are radially nonsymmetric with respect to the longitudinal median plane of the tire.

6. A tire casing as defined in claim 1 wherein said reinforcement comprises two plies, both the inner ply closer to said carcass and the outer ply closer to said tread increasing their distance from the carcass as said plies proceed from one side of said tire to the other side of said tire, the outer ply in addition becoming progressively spaced from said inner ply.

7. A tire casing as defined in claim 1 wherein said reinforcement comprises two plies, the inner ply, which is closer to said carcass, having a degree of curvature substantially parallel to said carcass in the first portion of said tire on one side of the longitudinal median plane of the tire and having a degree of curvature distinct from the degree of curvature of said carcass in the second portion of said tire on the opposite side of said longitudinal median plane, and the outer ply, which is closer to said tread, having a degree of curvature substantially parallel to the degree of curvature of said inner ply in the second portion of said tire and a degree of curvature distinct from the degree of curvature of said carcass in the first portion of said tire.

References Cited
UNITED STATES PATENTS

| | | | |
|---|---|---|---|
| 2,811,998 | 11/1957 | Bourdon | 152—361 |
| 3,057,392 | 10/1962 | Nallinger | 152—361 |
| 3,195,604 | 7/1965 | Boussu et al. | 152—361 |
| 3,231,000 | 1/1966 | Massoubre | 152—361 |

DRAYTON E. HOFFMAN, *Primary Examiner.*

UNITED STATES PATENT OFFICE
CERTIFICATE OF CORRECTION

Patent No. 3,395,745                        August 6, 1968

Jean-Marie Massoubre

It is certified that error appears in the above identified patent and that said Letters Patent are hereby corrected as shown below:

Column 3, line 38, after "carcass" cancel "43" and insert -- 53 --.

Signed and sealed this 23rd day of December 1969.

(SEAL)
Attest:

Edward M. Fletcher, Jr.                  WILLIAM E. SCHUYLER, JR.

Attesting Officer                                 Commissioner of Patents